US011839865B2

(12) United States Patent
Mykytiuk

(10) Patent No.: US 11,839,865 B2
(45) Date of Patent: Dec. 12, 2023

(54) CARBON-BASED SUBSTANCE FOR REMOVING SATURATED AND NON-SATURATED FATS, PETROLEUM AND PETROLEUM PRODUCTS FROM A WATER SURFACE AND/OR WATER EMULSION

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

(*) Notice: Subject to any disclaimer, the term of this patent is extended or adjusted under 35 U.S.C. 154(b) by 300 days.

(21) Appl. No.: 16/755,123

(22) PCT Filed: Oct. 19, 2018

(86) PCT No.: PCT/UA2018/000116
§ 371 (c)(1),
(2) Date: Apr. 9, 2020

(87) PCT Pub. No.: WO2019/083489
PCT Pub. Date: May 2, 2019

(65) Prior Publication Data
US 2020/0324274 A1   Oct. 15, 2020

(30) Foreign Application Priority Data

Oct. 23, 2017   (UA) ............................. a 2017 10237

(51) Int. Cl.
| B01J 20/28 | (2006.01) |
| B01J 20/04 | (2006.01) |
| B01J 20/20 | (2006.01) |
| B01J 20/30 | (2006.01) |
| C02F 1/68 | (2023.01) |
| C02F 1/28 | (2023.01) |
| C02F 101/32 | (2006.01) |
| C02F 103/00 | (2006.01) |

(52) U.S. Cl.
CPC ......... *B01J 20/28092* (2013.01); *B01J 20/04* (2013.01); *B01J 20/20* (2013.01); *B01J 20/28004* (2013.01); *B01J 20/3078* (2013.01); *C02F 1/681* (2013.01); *B01J 2220/4893* (2013.01); *C02F 1/283* (2013.01); *C02F 2101/325* (2013.01); *C02F 2103/007* (2013.01)

(58) Field of Classification Search
USPC ................ 210/669–693, 696–749, 908, 909, 210/660–694; 502/400, 416, 417–439
See application file for complete search history.

(56) References Cited

U.S. PATENT DOCUMENTS

| 5,282,975 A | 2/1994 | Maryasin |
| 6,220,323 B1 * | 4/2001 | Sandstrom ........... C08K 5/3432 |
| | | 152/905 |
| 8,962,520 B2 * | 2/2015 | Tso ....................... B01D 53/28 |
| | | 502/417 |

FOREIGN PATENT DOCUMENTS

| GB | 1397080 A | 6/1975 |
| RU | 2050329 C1 | 12/1995 |
| RU | 2117635 C1 | 8/1998 |
| RU | 2140488 C1 | 10/1999 |
| RU | 2524933 C1 | 8/2014 |
| UA | 298 | 4/1993 |
| UA | 41857 A | 9/2001 |
| UA | 104098 C2 | 12/2013 |

OTHER PUBLICATIONS

Zhu et al. (ACS Sustainable Chem., 2016, 4, 1050-1057). (Year: 2016).*
Li et al. (Industrial Crops and Products, 2008, 27, 341-347). (Year: 2008).*
Chen et al. (The Journal of Biological Chemistry, 1966, 242, 173-181). (Year: 1966).*
Olufemi et al. (Environ. Eng. Res., 2017, 22(4), 384-392). (Year: 2017).*
Gupta et al. (Journal of Colloid and Interface Science, 2014, 417, 420-430). (Year: 2014).*
Kuznetsov et al., "Methods of porous materials obtaining from lignin and wood bark", Journal of Siberian Federal University, 2015, vol. 8, pp. 232-255.
Temirkhanov et al., "New carbon materials for liquidation of overflows of neftinovye carbon materials for liquidation of overflows of oil", Fundamental research, 2012, No. 6, pp. 471-475.
Yuen, F.K., Hameed, B.H. "Recent developments in the preparation and regeneration of activated carbons by microwaves", Advancees in colloid and interface science, 2009, vol. 149, pp. 19-27.

* cited by examiner

*Primary Examiner* — Clare M Perrin
(74) *Attorney, Agent, or Firm* — Loginov & Associates, PLLC; William A. Loginov

(57) ABSTRACT

The present invention relates to a carbon-based substance for removing saturated and non-saturated fats, petroleum and petroleum products from a water surface and/or water emulsion. Furthermore, the present invention also relates to a method for producing this carbon-based substance. More specifically, the present invention relates to use of this carbon-based substance for removing saturated and non-saturated fats, petroleum and petroleum products from a water surface of open waters, including seas and oceans.

13 Claims, No Drawings

CARBON-BASED SUBSTANCE FOR REMOVING SATURATED AND NON-SATURATED FATS, PETROLEUM AND PETROLEUM PRODUCTS FROM A WATER SURFACE AND/OR WATER EMULSION

FIELD OF THE INVENTION

The present invention relates to a carbon-based substance for removing saturated and non-saturated fats, petroleum and petroleum products from a water surface and/or water emulsion. Furthermore, the present invention also relates to a method for producing this carbon-based substance. More specifically, the present invention relates to use of this carbon-based substance for removing saturated and non-saturated fats, petroleum and petroleum products from a water surface and/or water emulsion.

BACKGROUND OF THE INVENTION

A sorbing agent for cleaning a water surface from petroleum and petroleum products, the agent comprising organosilica and thermally expanded graphite with the following ratio of components:
organosilica being 75-92 wt. % and thermally expanded graphite being 5-25 wt. % (patent of the Ukraine No. 298 published on Apr. 30, 1993) is a prototype of the carbon-based substance for removing saturated and non-saturated fats, petroleum and petroleum products from a water surface and/or water emulsion.

This patent observes an efficacy of using the proposed sorbing agent and it notes a high absorbance of petroleum and petroleum products, a possibility of localization of a petroleum spill and enabling protection of a beach edge.

The carbon-based substance for removing saturated and non-saturated fats, petroleum and petroleum products from a water surface and/or water emulsion differs from the propotype in that a carbon having calcium impurities at moderate temperatures from 70 to 99° C. is used as a petroleum and petroleum products sorbing agent, rather than organosilica and thermally expanded graphite, the carbon having an extensive network of macropores as compared to the organosilica and thermally expanded graphite.

The difference of the carbon-based substance for removing saturated and non-saturated fats, petroleum and petroleum products from a water surface and/or water emulsion lies in that the average particle size of the carbon is from 100 to 1000 microns.

The carbon-based substance for removing saturated and non-saturated fats, petroleum and petroleum products from a water surface and/or water emulsion is more effective and requires significantly less time to remove saturated and non-saturated fats, petroleum and petroleum products from a water surface and/or water emulsion.

SUMMARY OF THE INVENTION

The present invention is aimed at provision of a carbon-based substance for removing saturated and non-saturated fats, petroleum and petroleum products from a water surface and/or water emulsion.

The inventors have revealed that this carbon-based substance is highly hydrophobic and water saturation does not exceed 5 weight % after contacting the water during more than 15 days. This carbon-based substance attracts and retains saturated and non-saturated fats, petroleum and petroleum products, thereby forming a stable suspension with substances therewith. Organic solvents and the vast majority of petroleum products are absorbed by the carbon. Saturated, non-saturated fats and petroleum with the carbon-based substance form a stable suspension with other substances due to their branched surface structure that does not break down during more than 30 days and does not mix with water.

The present invention also proposes a method for producing a carbon-based substance for removing saturated and non-saturated fats, petroleum and petroleum products from a water surface and/or water emulsion. Another aim of the present invention lies in use of a carbon-based substance for removing saturated and non-saturated fats, petroleum and petroleum products from a water surface and/or water emulsion.

Other advantages and embodiments of the present invention will become clear from the description stated hereinafter.

DETAILED DESCRIPTION OF THE INVENTION

According to the present invention, a novel carbon-based substance for removing saturated and non-saturated fats, petroleum and petroleum products from a water surface and/or water emulsion is obtained.

According to the present invention, the carbon-based substance for removing saturated and non-saturated fats, petroleum and petroleum products from a water surface and/or water emulsion is able to saturate with water for up to 5 weight % during more than 15 days of contact between this carbon-based substance with water. It attracts and retains saturated and non-saturated fats, petroleum and petroleum products. Organic solvents and the vast majority of petroleum products are absorbed by the carbon.

Saturated, non-saturated fats and petroleum with the carbon-based substance form a stable suspension with other substances due to their branched surface structure that does not break down during more than 30 days and does not mix with water.

The carbon-based substance comprises from 70% to 99% of carbon, from 1% to 30% of calcium and it is chemically and biologically inert. The average fraction size of the carbon-based substance is from 100 to 1000 microns. The particles have amorphous, solid shape with undeveloped network of micropores and mesopores, while the network of macropores is fairly developed.

The method for producing the carbon-based substance for removing saturated and non-saturated fats, petroleum and petroleum products from a water surface and/or water emulsion comprises heating a raw material (fabricated rubber products) in an oxygen-eliminating atmosphere up to the temperature of more than 800° C. using a microwave irradiation as a source of energy to remove the formed gases, and creating a rate of rising the temperature of 50° C.-100° C. per minute, which provides the carbon-based substance with properties, which are claimed according to the present invention.

Use of the carbon-based substance for removing saturated and non-saturated fats, petroleum and petroleum products from a water surface and/or water emulsion is performed in case of spilling the petroleum or petroleum products in open waters, including seas and oceans, by means of localization of places, where the spilling the petroleum or petroleum products has occurred. Also, the carbon-based substance is used for cleaning water bodies from petroleum or petroleum products, cleaning industrial waters and dewatering of solid domestic wastes landfills from saturated and non-saturated fats, petroleum and petroleum products, as well as cleaning open waters and water-accumulating stations from overgrowing of blue-green and other microalgae.

Therefore, the carbon-based substance for removing saturated and non-saturated fats, petroleum and petroleum products from a water surface and/or water emulsion can be used both separately and in combination with other substances.

The carbon-based substance for removing saturated and non-saturated fats, petroleum and petroleum products from a water surface and/or water emulsion is more effective and requires significantly less time to remove saturated and non-saturated fats, petroleum and petroleum products from a water surface and/or water emulsion.

The invention claimed is:

1. A method for producing a carbon-based substance for removing saturated and non-saturated fats, petroleum and petroleum products from a water surface and/or water emulsion, the method consisting of:
   heating a raw material in an oxygen-eliminating atmosphere with a heating range from 50° C.-100° C. per minute up to a temperature of more than 800° C. using a microwave irradiation as a source of energy to remove gases formed during the heating and to convert the raw material into a carbon-based substance with predefined properties, the carbon-based substance having
   carbon in a range of 70% to 98% and calcium in a range of 2% to 30%.

2. The method of claim 1, wherein the raw material consists of fabricated rubber products.

3. The method of claim 1, wherein the predefined properties include particles having an average particle size ranging from 100 to 1000 microns.

4. The method of claim 1, wherein the predefined properties include an amorphous solid structure having a network of micropores, mesopores, and macropores.

5. The method of claim 1, wherein the predefined properties include hydrophobic properties that limit water saturation of the substance to below 5 weight %.

6. A method for producing a carbon-based substance for removing saturated and non-saturated fats, petroleum and petroleum products from a water surface and/or water emulsion, the method comprising:
   heating a raw material consisting of fabricated rubber products in an oxygen-eliminating atmosphere with a heating range from 50° C.-100° C. per minute up to a temperature of more than 800° C. using a microwave irradiation as a source of energy;
   removing gases formed during the heating of the raw material; and
   converting the raw material into a carbon-based substance with carbon in a range of 70% to 98% and calcium in a range of 2% to 30%.

7. The method of claim 6, wherein producing the carbon-based substance includes producing carbon in the form of particles having an average particle size ranging from 100 to 1000 microns.

8. The method of claim 6, wherein producing the carbon-based substance includes producing carbon with an amorphous solid structure having a network of micropores, mesopores, and macropores.

9. The method of claim 6, wherein producing the carbon-based substance includes providing hydrophobic properties that limit water saturation of the substance to below 5 weight %.

10. A method for producing a carbon-based substance from fabricated rubber products for removing saturated and non-saturated fats, petroleum and petroleum products from a water surface and/or water emulsion, the method consisting of:
    configuring an oxygen-eliminating atmosphere to support a heating range from 50° C.-100° C. per minute up to a temperature of more than 800° C. using a microwave irradiation as a source of energy;
    removing gases formed by heating the fabricated rubber products with the microwave irradiation in the oxygen-eliminating atmosphere; and
    converting the fabricated rubber products in the oxygen-eliminating atmosphere into a carbon-based substance with predefined properties including carbon in a range of 70% to 98% and calcium in a range of 2% to 30%.

11. The method of claim 10, wherein producing the carbon-based substance includes producing carbon in the form of particles having an average particle size ranging from 100 to 1000 microns.

12. The method of claim 10, wherein producing the carbon-based substance includes producing carbon with an amorphous solid structure having a network of micropores, mesopores, and macropores.

13. The method of claim 10, wherein producing the carbon-based substance includes providing hydrophobic properties that limit water saturation of the substance to below 5 weight %.

* * * * *